Sept. 19, 1967   E. J. KOSINSKY ET AL   3,342,901
BLENDING OF THERMOPLASTIC MATERIAL
Filed Jan. 28, 1963
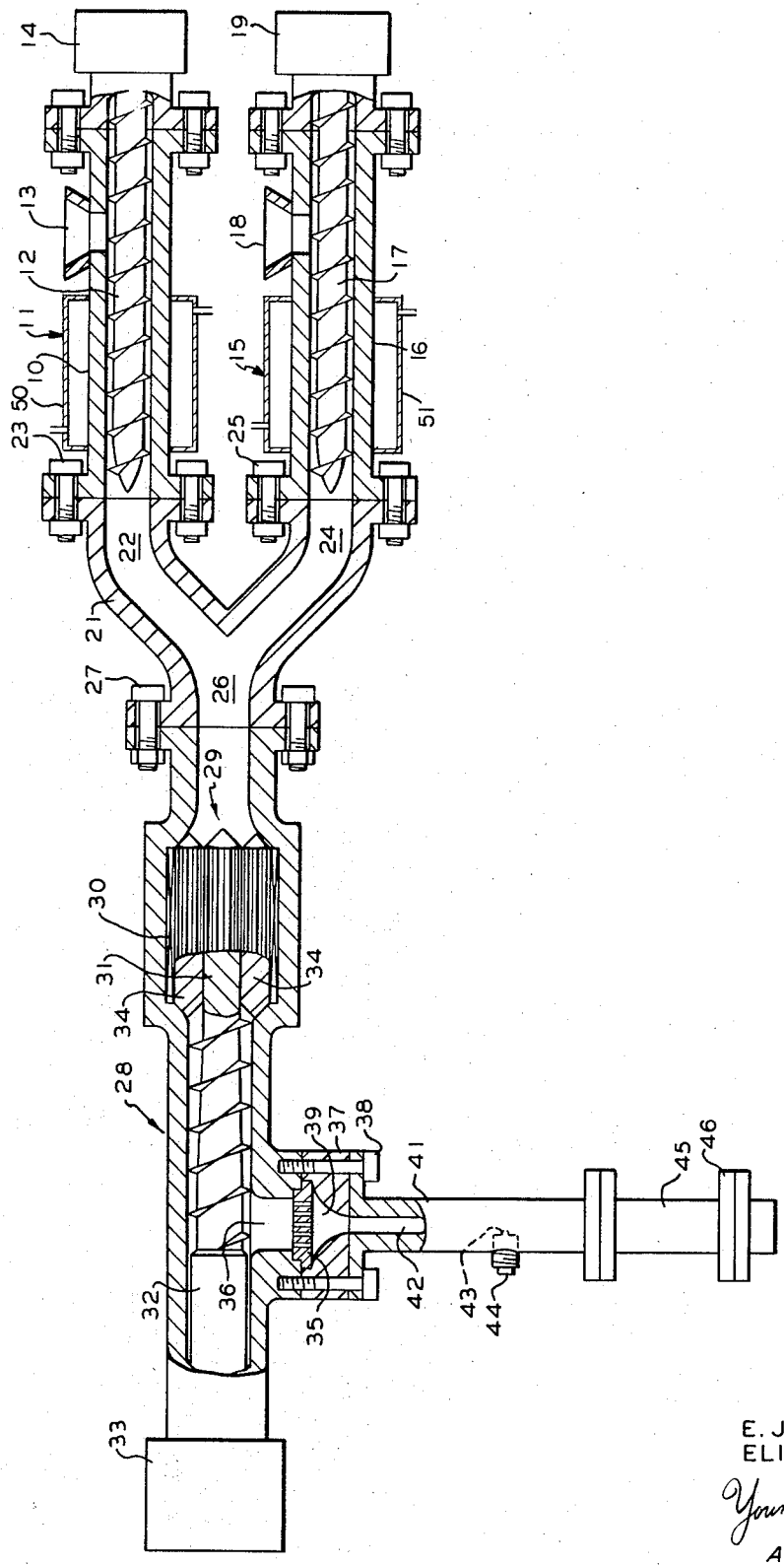
INVENTORS
E. J. KOSINSKY
ELI SOLOP
*Young & Quigg*
ATTORNEYS

United States Patent Office 3,342,901
Patented Sept. 19, 1967

3,342,901
BLENDING OF THERMOPLASTIC MATERIAL
Edward J. Kosinsky and Eli Solop, Bartlesville, Okla., assignors to Phillips Petroleum Company, a corporation of Delaware
Filed Jan. 28, 1963, Ser. No. 254,120
7 Claims. (Cl. 260—897)

This invention relates to method and apparatus for blending thermoplastic materials.

Although the invention is broadly applicable to the blending of all types of thermoplastic materials, the description will be simplified by limiting the discussion to the blending of solid 1-olefin polymers.

The polymerization of 1-olefins to solid polymer is well known in the art with one such suitable method being disclosed in U.S. Patent No. 2,825,721 issued Mar. 4, 1958, to Hogan and Banks. Such polymers are noted for their high density and high crystallinity making them suitable for many uses. Recently, it has been discovered that there is a polymerization temperature range in the broad range disclosed by Hogan et al. in which it is possible to produce increased yields of high molecular weight polymers of ethylene which are insoluble in the hydrocarbon diluent. One method for preparing insoluble particle form polymer comprises contacting ethylene or mixtures of ethylene with other unsaturated hydrocarbons with a suspension of a chromium oxide-containing catalyst in a liquid hydrocarbon diluent, the contacting occurring at a temperature such that substantially all of the polymers produced are insoluble in the diluent and in solid particle form, the particles being substantially non-tacky and non-agglutinative and suspended in the liquid diluent. Liquid hydrocarbons which can be used as the diluent are those which are liquid and chemically inert under the reaction conditions. Paraffins, such as those having from 3 to 12, preferably from 3 to 8, carbon atoms per molecule can be advantageously utilized in the practice of the instant invention. Examples of paraffins which can be used include propane, n-butane, n-pentane, isopentane, n-hexane, n-decane, 2,2,4-trimethylpentane (isooctane), and the like. It is to be understood that some naphthenes can be tolerated in the liquid paraffin, and that mixtures of paraffins and/or isoparaffins can be employed. Another class of hydrocarbons which can be used are naphthenic hydrocarbons having from 5 to 6 carbon atoms in a naphtheinc ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexenes, and the ethyl propyl cyclohexanes. A preferred subclass of naphthenic hydrocarbons within the above described general class is constituted by those naphthenic hydrocarbons having from 5 to 6 carbon atoms in a single ring and from 0 to 2 methyl groups as the only substituents on the ring. Thus, the preferred naphthenic hydrocarbons are cyclopentane, cyclohexane, methylcyclopentane, methylcyclohexane, the dimethylcyclopentanes, and the dimethylcyclohexanes. It is also within the scope of the invention to utilize mixtures of paraffinic and naphthenic hydrocarbons as the reaction medium.

When utilizing butane and higher paraffinic hydrocarbons as the reaction medium, the polymerization temperature is generally in the range of about 230° F. and below, preferably 225° F. and below. Propane having a critical temperature of about 206° F. is useful in the range in which it can be maintained in the liquid phase. The temperature range for naphthenic hydrocarbons is about 190° F. and below, preferably about 180° F. and below. If mixtures of paraffinic and naphthenic hydrocarbons are employed, the upper temperature limit will be between 190 and 230° F., depending upon the composition of the mixture.

With regard to the upper temperature limits set forth hereinabove, in the case of paraffinic diluents, the temperature is approximately 230° F. and for cycloparaffinic diluents approximately 190° F. There is a very narrow temperature range or area where the transformation, i.e., from tacky, agglomerated polymer to granular polymer, takes place, and conditions can be varied so as to change the absolute upper limit slightly. However, the absolute upper limits for paraffins and cycloparaffins are approximately the temperature indicated, and at the preferred upper limits granular polymer is formed in all cases. The lower temperature limit for practicing the process of this invention is not critical, but the reaction rate is undesirably low below 150° F. and impractical below 100° F.

The catalyst utilized in the preparation of the particle form polymer comprises as an essential ingredient, chromium oxide, preferably including a substantial amount of hexavalent chromium. The chromium oxide is ordinarily associated with at least one other oxide, particularly at least one oxide selected from the group consisting of silica, alumina, zirconia and thoria. Catalysts which are particularly suited for utilization in this process are disclosed in said Hogan and Banks patent. The process is a particularly desirable one in view of yields as high as 20,000 pounds of polymer per pound of catalyst.

The polymers formed by such methods are characterized by a low melt index as hereinafter defined. It has been found that blending of these low melt index polymers with higher melt index polymers or copolymers extends their usefulness. A number of methods have been proposed for the blending of olefin polymers including the blending of the polymer while dissolved in a solvent as well as various methods of mechanically blending. Due primarily to differences in melt indices of the components being blended, it is frequently difficult to obtain a uniform blend without the presence, for instance, of "islands" of undissolved or unblended polymers.

According to this invention there is provided an improved method for blending thermoplastic materials comprising subjecting a first thermoplastic material to a temperature sufficient to melt said first thermoplastic material and achieve a first value of melt viscosity for the thus melted first thermoplastic material, subjecting a second thermoplastic material to a temperature sufficient to melt said second thermoplastic material and achieve a second value of melt viscosity for the thus melted second thermoplastic material, said first value and said second value being approximately equal or at least as close as possible, and intimately admixing said thus melted first thermoplastic material and said thus melted thermoplastic material.

Also in accordance with this invention there is provided improved apparatus for blending materials which comprises first means for producing a first material in a molten state, second means for producing a second material in a molten state, and means for intimately admixing the first and second materials while in their molten states. In a presently preferred embodiment of the apparatus there is provided a plurality of extruders, a milling device, such as an Egan milling head having a separate drive, and means for passing the output of each of the extruders into the inlet of the milling device. The provision of separate drives for each of the extruders and the milling device greatly enhances the utililzation of the apparatus by increasing its versatility. Thus it is possible to visbreak a thermoplastic material in one of the extruders while merely plasticizing a second thermoplastic material in another one of the extruders and to conduct a blending operation and/or additional visbreaking operation in the milling device.

It is an object of this invention to provide a novel method for blending thermoplastic materials, e.g., 1-olefin polymers.

It is another object of this invention to provide novel apparatus suitable for the blending of thermoplastic materials, e.g., polymers of 1-olefin.

It is a further object of this invention to provide an improved blend of thermoplastic materials having a greater degree of homogeneity.

It is another object of the invention to provide novel apparatus having greater versatility for utilization in blending and/or visbreaking operations.

Other aspects, objects, and advantages of the invention will become apparent from a study of the disclosure, the drawing and the appended claims to the invention.

The present invention is particularly suited to the blending of low melt index particle form 1-olefin polymers and a higher melt index solution type 1-olefin polymer, and for purposes of simplicity will be described in terms of such a blending operation. The olefins employable for the preparation of normally solid polymers useful in this invention include 1-olefins having a maximum of 8 carbon atoms per molecule and no branching nearer the double bond than the 4-position, for example, ethylene, propylene, 1-butene, 1-pentene, 1,3-butadiene. The term "polymer" includes homopolymers and copolymers of the 1-olefins, examples of the latter include ethylene-propylene copolymer and ethylene-butene copolymer.

The olefin polymer referred to herein can be prepared by any known method, for example by the method of Hogan et al., Patent No. 2,825,721, wherein a method is disclosed whereby polymers and copolymers can be produced by contacting one or more olefins with a catalyst comprising as an essential ingredient chromium oxide, preferably including a substantial amount of hexavalent chromium. The chromium oxide is associated with at least one of the oxides selected from the group consisting of silica, alumina, zirconia and thoria.

In a presently preferred blend the high melt index solution type polymer is a polymer of a 1-olefin having a density in the range of about 0.94 to about 0.99 grams per cc., a molecular weight above 25,000 and a melt index of less than about 20 and preferably in the range of about 1 to about 12. The low melt index polymer is compatible with the high melt index polymer and is a particle form polymer of ethylene or copolymer of ethylene with other unsaturated hydrocarbons, for example a copolymer of ethylene and one or more of propylene, 1-butene, 1-pentene, 1-hexene and the like. The low melt index polymer can have a density in the range of about 0.92 to about 0.95 grams per cc., and a melt index of less than 5 and usually in the range of about 0.001 to about 2.0 (high load melt index).

If desired, the high molecular weight, highly crystalline particle form polymer can be cracked (pyrolyzed) to increase the melt index and improve the processability and extrudability thereof. The cracking can be accomplished under controlled conditions such as heating the polymer in an inert atmosphere, for example nitrogen, at atmospheric pressure or slightly reduced pressures, usually not below 600 millimeters of mercury and at an internal temperature of the polymer in the range of about 600 to about 900° F., preferably in the range of about 700 to about 800° F., for a residence time in the range of from about 1 to about 10 minutes. The polymer can be heated rapidly until it is in a molten or liquid state. In some instances, a product of the desired molecular weight, melting point and melt index can be obtained by heating the polymer until it is all in a molten state and then removing the source of heat. In other cases, the molten mass is stirred and heating is continued for a period which generally does not exceed 30 minutes. The time of heating is governed by the temperature employed and the properties of the product desired. In other words, as the temperature is increased a shorter time is employed to achieve the same degree of pyrolysis. One suitable method for pyrolyzing olefin polymer is described in the copending application of Canterino and Gallaugher, Ser. No. 556,471, filed December 30, 1955. Preferably, the particle form polymers, after pyrolysis, have a density in the range of about 0.92 to about 0.99 grams per cc. and a melt index in the range of about 0.1 to about 80, preferably in the range of about 0.2 to about 50, and more preferably in the range of about 5.0 to about 35.

The particle form polymer can be visbroken and processed or extruded by any suitable type of apparatus by any suitable method. Suitable apparatus include extruders, such as those manufactured by National Rubber Machinery Company or Welding Engineers, Inc., wherein the temperature is elevated to the desired level and the polymer remains for the desired period of time.

Suitable uses for blends of the high melt index and low melt index polymers are for bottles, pipe, filament, paper coating and many others.

For melt index, the method of ASTM D-1238-52T is used with five runs being run at two-minute intervals, averaging weights, discarding any values which deviate from the average by more than 5 weight percent, reaveraging and multiplying by five to obtain the amount of extrudate in ten minutes. If the melt index is low, such as less than 1.0, the high load melt index may be obtained by ASTM D-1238-57T (procedure 5) using a weight of 21,600 grams. Unless specified otherwise, all references herein to melt index refer to the former.

Density as used herein is determined by compression molding a slab of the polymer, cooling said molding at a temperature reduction rate of 15 to 20° F. per minute to room temperature, cutting a pea-sized specimen therefrom, and placing such specimen in a 50 ml. glass stoppered graduate. Carbon tetrachloride and methylcyclohexane are added to the graduate in burettes in proportions such that the specimen is suspended in solution. During the addition of the liquids, the graduate is shaken to secure thorough mixing. When the mixture just suspends the specimen, a portion of the liquid is transferred to a small test tube and placed on the platform of a Westphal balance and a glass bob lowered therein. With the temperature shown by the thermometer in the bob in the range 73 to 78° F., the balance is adjusted until the pointer is at 0. The value shown on the scale is taken as the specific gravity.

Referring now to the drawing there is shown a cylindrical housing 10 of a first conventional extrusion machine 11 having feed screw 12 mounted coaxially therein and a suitable feed port 13. A suitable driving means 14, such as an electric motor, is attached to the upstream end of housing 11 and is operatively connected to screw 12. A second conventional extrusion machine 15 comprises a cylindrical housing 16 having feed screw 17 mounted coaxially therein and feed port 18. A suitable driving means 19 is mounted on the upstream end of housing 16 and is operatively connected to feed screw 17. Y connecting member 21 has a first inlet 22 thereof connected to the output end of housing 10 by suitable means, for example bolts 23. The second inlet 24 of Y connecting member 21 is connected to the output end of housing 16 by suitable means, such as bolts 25. The output 26 of Y connecting member 21 is connected by suitable means, such as bolts 27, to the input end of milling device 28 which contains a suitable milling head 29, such as an Egan milling head, the details of which are disclosed in U.S. Patent 2,785,438. Milling head 29 comprises an internal gear 30 mounted within the housing of milling device 28 by any suitable means to prevent rotation of the internal gear, a drive pinion 31 which is connected by any suitable means to or can form a part of a drive shaft 32 which is driven by suitable means such as motor 33, and a plurality of floating pinions 34 meshing with and disposed between drive pinion 31 and internal gear 30 and which rotate free from each other. If desired, drive shaft 32 can be provided with suitable threads to assist in removing the blend from the milling head. A strainer plate and screen pack 35 is held in place across the discharge outlet 36 of milling device 28 by movable die gate 37 which in turn is secured to the housing of milling device 28 by suitable means, such as bolts 38. Die gate 37 has a streamlined transition passageway or extrusion orifice 39 located therein. An extrudate pressure control valve 41 having passageway 42 therethrough is secured to die gate 37 by any suitable means, such as bolts 38, such that passageway 42 is substantially coaxial with extrusion orifice 39. The extrudate pressure control valve 41 comprises a plug member 43 mounted in the housing of extrudate pressure control valve 41 and adapted to vary the opening in passageway 42. Plug member 43 is actuated by externally controlled plug stem 44. Any desired type of apparatus, for example a polymer cooling tube 45 and strand die 46, can be attached to the exit end of extrudate pressure control valve 41.

A first material to be blended, such as low melt index particle form polymer is fed into housing 10 through feed port 13. Feed screw 12 is rotated by motor 14 in such a direction as to advance the material to the left as viewed in the drawing. The material is plasticized by the action of the rotation of screw 12. If desired housing 10 can be surrounded by any suitable means 50 for heating or cooling as required. A second material to be blended, such as a high melt index solution type polymer, is introduced into housing 16 by way of feed port 18. Screw 17 is rotated by motor 19 in such a direction as to advance the material to the left as viewed in the drawing. The material is plasticized through the action of screw 17. Housing 16 can also be surrounded by any suitable means 51 for heating or cooling as required.

In accordance with a presently preferred embodiment of the invention the temperature of the low melt index thermoplastic polymer in housing 10 is raised to such a point that the material is melted and achieves a first value of viscosity while the temperature of the high melt index thermoplastic material in housing 16 is raised until the material is melted and has achieved a second value of viscosity, the first and second values of viscosity being substantially equal or at least as nearly equal as possible. The introduction of the two thermoplastic materials directly into milling device 28 at substantially the same values of viscosity or at least as nearly the same values of viscosity as possible without prior admixing greatly enhances the ease of blending of the two materials by milling head 29 by permitting the thorough blending of the two materials while at substantially the same or as nearly the same values of viscosity as possible before heat interchange between the two materials.

The weight ratio of the low melt index particle form polymer to the high melt index solution type polymer in the blend can be any desired ratio. Preferably, the ratio is in the range of about 0.05 to about 3, and more preferably in the range of about 0.1 to about 1. The preferred ratios are dependent upon the desired properties of the blend.

It is frequently preferred that the extrudation of the mixture from strand die 46 be conducted in an inert atmosphere such as nitrogen, water, hot oil and the like. This inert atmosphere not only assists in the cooling of the extrudate but also prevents oxidation which causes the formation of black or dark colored deposits on the die face. Such deposits flake off in the strands of polymer and are not desirable.

For materials containing significant quanties of volatile material, it is within the contemplation of the invention to include a vent section in the respective extruder housing. While extrudate pressure control valve 41 has been disclosed as being downstream of milling device 28, it is within the contemplation of the invention to utilize an extrudate pressure control valve on one or more of the extruders 11 and 15. Also while the invention has been illustrated as utilizing two extruders, it is within the scope of the invention to utilize a plurality of extruders having the output thereof connected to the input of the milling device. Any one or more of he extruders can be provided with suitable means, such as a Dulmage screw, for visbreaking the material passing therethrough. While the milling head 29 has been illustrated as an Egan head, any suitable milling head, for example a Dulmage screw, can be utilized.

It is also within the scope of the invention to blend one or more thermoplastic materials with additional materials such as antioxidants, filters, pigments, dyes, lubricants, plasticizers and the like. These additives can be fed through a separate extruder to the milling device, added with the polymer feed to an extruder, or introduced into one or more extruders by way of a vent port of second feed port.

The speeds of the feed screws of each extruder and the milling head can be varied independently of each other to provide greater flexibility. Each extruder can be provided with a screen pack, orifice or other means to permit the extruders to be operated at different values of gate pressure.

The following examples are presented in further illustration of the invention and are not to be unduly construed in limitation thereof.

*Example I*

A particle form polymer of ethylene having a density of approximately 9.94 grams per cc. and a high load melt index of approximately 2 is fed at a rate of approximately 58 pounds per hour into a 2½ inch National Rubber Machinery (NRM) extruder. The extruder has a 24:1 length/diameter ($L/D$) ratio and a 2½/1 compression ratio metering type screw. The screw is operated at a speed of approximately 62 r.p.m. The gate temperature and pressure are 510° F. and 1050 p.s.i. A solution form polymer of ethylene having a density of approximately 0.95 grams per cc. and a melt index of approximately 6.5 is fed at a rate of approximately 61 pounds per hour into a 2½ inch NRM extruder having a 20:1 $L/D$ ratio and a 4/1 compression ratio metering type screw. The screw is operated at a speed of approximately 69 r.p.m. The gate temperature and pressure are 305° F. and 1000 p.s.i. The outputs from each of these extruders is simultaneously fed into a Model 234–8–8/2 Egan milling head with a 20 H.P. drive. Four of its eight pins are removed to reduce the pressure drop across the milling head. The milling head is driven at approximately 78 r.p.m. The output is taken from a side port in the milling head housing and passed through a stranding die and then through a water cooling bath. The cooled polymer is then chopped into pellets. 119 pounds per hour of blended polymer with a melt index of about 0.3 is obtained.

*Example II*

A particle form polymer of ethylene having a density of approximately 0.94 grams per cc. and a high load melt index of approximately 2 is fed at a rate of approximately 18 pounds per hour into a 2½ inch NRM extruder having a 24:1 $L/D$ ratio and a 2½/1 compression ratio metering type screw. The screw is operated at a speed of approximately 21 r.p.m. The gate temperature and pressure are 495° F. and 425 p.s.i. A solution form polymer of ethylene having a density of approximately 0.95 grams per cc. and a melting index of approximately 6.5 is fed at a rate of approximately 61 pounds per hour into a 2½ inch NRM extruder having a 20:1 $L/D$ ratio and a 4/1 compression ratio metering type screw. The screw is operated at approximately 69 r.p.m. The gate temperature and pressure are 305° F. and 1000 p.s.i. The output from each of these extruders is simultaneously fed into a Model 234–8–8/2 Egan milling head with a 20 H.P. apparatus drive having four of the eight pins removed. The milling head is driven at approximately 78 r.p.m. and the output is taken from a side port in the milling head housing and passes through a stranding die followed by a water cooling bath and a pelletizer. 79 pounds per hour of blended polymer having a melt index of approximately 0.9 is obtained.

Reasonable variations and modifications are possible within the scope of the disclosure, the drawings and the appended claims to the invention.

We claim:

1. A method for blending thermoplastic materials which comprises subjecting a first thermoplastic material to a first temperature sufficient to melt said first thermoplastic material different from said first thermoplastic material and achieve a first value of melt viscosity for the thus melted first thermoplastic material, subjecting a second thermoplastic material different from said first thermoplastic material to a second temperature different from said first temperature and sufficient to melt said second thermoplastic material and achieve a second value of melt viscosity for the thus melted second thermoplastic material, said first value and said second value being substantially similar, and intimately admixing said thus melted first thermoplastic material and said thus melted second thermoplastic material while said melted first thermoplastic material has said first value of melt viscosity and said melted second thermoplastic material has said second value of melt viscosity, and recovering the resulting blend as a product of the process.

2. A method in accordance with claim 1 wherein said first thermoplastic material is a low melt index particle form polymer of a 1-olefin and said second thermoplastic material is a high melt index solution form polymer of a 1-olefin.

3. A method in accordance with claim 2 wherein each said 1-olefin has a maximum of 8 carbon atoms per molecule and no branching nearer the double bond than the 4-position.

4. A method in accordance with claim 1 wherein said first thermoplastic material is a polymer of a 1-olefin having a density in the range of about 0.94 to about 0.99 gram per cc. and a melt index of less than 20; and wherein said second thermoplastic material is a polymer of a 1-olefin having a density in the range of about 0.92 to about 0.95 gram per cc. and a high load melt index of less than 5.

5. A method in accordance with claim 1 wherein said first thermoplastic material is a polymer of a 1-olefin having a maximum of 8 carbon atoms per molecule and no branching nearer the double bond than the 4-position, said first thermoplastic material having a density in the range of about 0.94 to about 0.99 gram per cc. and a melt index in the range of about 1 to about 12; and wherein said second thermoplastic material is a polymer of a 1-olefin having a maximum of 8-carbon atoms per molecule and no branching nearer the double bond than the 4-position, said second thermoplastic material having a density in the range of about 0.92 to about 0.95 grams per cc. and a high load melt index in the range of about 0.001 to about 2.

6. A method in accordance with claim 1 wherein said first thermoplastic material is a polymer of a 1-olefin having a maximum of 8 carbon atoms per molecule and no branching nearer the double bond than the 4-position, said first thermoplastic material having a density in the range of about 0.94 to about 0.99 grams per cc. and a melt index in the range of about 1 to about 12; and wherein said second thermoplastic material is a polymer of a 1-olefin having a maximum of 8 carbon atoms per molecule and no branching nearer the double bond than the 4-position, said second thermoplastic material having a density in the range of about 0.92 to about 0.99 gram per cc. and a melt index in the range of about 0.1 to about 80.

7. A method for blending materials which comprises producing a first normally solid material in a molten state at a first temperature and having a first value of melt viscosity, producing a second normally solid material in a molten state at a second temperature different from said first temperature and having a second value of melt viscosity, said first value and said second value being as nearly the same as possible, introducing said first material and said second material into a milling zone while said first material has said first value of melt viscosity and said second material has said second value of melt viscosity, and intimately admixing the materials in said milling zone.

References Cited

UNITED STATES PATENTS

| | | | |
|---|---|---|---|
| 1,352,655 | 9/1920 | Buchanan | 23—285 X |
| 1,516,450 | 11/1924 | Miles | 23—285 X |
| 2,519,014 | 8/1950 | Bankey | 18—2 |
| 2,595,210 | 4/1952 | Clinefelter | 18—2 |
| 2,836,851 | 9/1955 | Holt | 8—12 |
| 2,868,762 | 1/1959 | Oakes | 260—897 |
| 3,070,427 | 12/1962 | Harris et al. | 23—285 X |
| 3,086,958 | 4/1963 | Canterino | 260—897 |
| 3,121,070 | 2/1964 | Coover et al. | 260—897 |
| 3,132,194 | 5/1964 | Edmonds et al. | 264—37 |

MURRAY TILLMAN, *Primary Examiner.*

DONALD E. CZAJA, *Examiner.*

J. A. KOLASCH, D. J. BREZNER, *Assistant Examiners*

UNITED STATES PATENT OFFICE
CERTIFICATE OF CORRECTION

Patent No. 3,342,901　　　　　　　　　　　　September 19, 1967

Edward J. Kosinsky et al.

It is hereby certified that error appears in the above numbered patent requiring correction and that the said Letters Patent should read as corrected below.

Column 7, lines 15 and 16, strike out "different from said first thermoplastic material".

Signed and sealed this 22nd day of October 1968.

(SEAL)
Attest:

Edward M. Fletcher, Jr.　　　　　　　　　　　　EDWARD J. BRENNER
Attesting Officer　　　　　　　　　　　　　　　Commissioner of Patents